US009982586B2

(12) United States Patent
Sovine et al.

(10) Patent No.: US 9,982,586 B2
(45) Date of Patent: May 29, 2018

(54) INTEGRATED COOLING AIR SHROUD ASSEMBLY

(71) Applicant: FORD GLOBAL TECHNOLOGIES, LLC, Dearborn, MI (US)

(72) Inventors: Michael Brett Sovine, Canton, MI (US); Erin Gibb, Ontario (CA); Erik M. Weber, Canton, MI (US); Michael Thomas Kramer, Grosse Pointe, MI (US); Mohammad Olfatnia, Ann Arbor, MI (US); Andrew Murphy, Grosse Pointe, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 104 days.

(21) Appl. No.: 14/734,000

(22) Filed: Jun. 9, 2015

(65) Prior Publication Data
US 2016/0363039 A1     Dec. 15, 2016

(51) Int. Cl.
F01P 3/18       (2006.01)
F01P 5/06       (2006.01)
F02B 29/04      (2006.01)

(52) U.S. Cl.
CPC ...... F01P 3/18 (2013.01); F01P 5/06 (2013.01); F02B 29/0425 (2013.01); F02B 29/0431 (2013.01); F01P 2060/02 (2013.01); Y02T 10/146 (2013.01)

(58) Field of Classification Search
CPC ........................................................ F01P 11/10
USPC ...................................................... 123/41.49
See application file for complete search history.

(56) References Cited

U.S. PATENT DOCUMENTS

| | | | | |
|---|---|---|---|---|
| 4,651,816 A * | 3/1987 | Struss | ..................... | F28F 9/002 165/140 |
| 5,660,149 A * | 8/1997 | Lakerdas | .................. | F01P 5/06 123/41.01 |
| 6,044,810 A * | 4/2000 | Surridge | ............... | F04D 29/023 123/41.49 |
| 6,070,560 A * | 6/2000 | Johnston | ................... | F01P 5/02 123/41.11 |
| 7,121,369 B2 * | 10/2006 | Beck | ...................... | B60K 11/04 165/149 |
| 8,061,410 B2 * | 11/2011 | Machanek | ............ | F28D 1/0443 165/140 |
| 9,316,140 B2 * | 4/2016 | Stumpf | ..................... | F01P 3/18 |
| 2005/0217907 A1 * | 10/2005 | Madson | ................... | F01P 5/06 180/68.1 |

(Continued)

FOREIGN PATENT DOCUMENTS

JP      2010025009 A      2/2012

OTHER PUBLICATIONS

English machine translation for JP2010025009.

*Primary Examiner* — Joseph Dallo
*Assistant Examiner* — Yi-Kai Wang
(74) *Attorney, Agent, or Firm* — Julia Voutyras; King & Schickli PLLC

(57) ABSTRACT

An integrated air shroud assembly is provided for a motor vehicle. That air shroud assembly includes a body having a radiator opening, a charge air cooler opening and a cooling fan opening. The charge air cooler opening is offset from the radiator opening and the radiator opening and the charge air cooler opening are in parallel communication with the cooling fan opening.

9 Claims, 5 Drawing Sheets

(56) References Cited

U.S. PATENT DOCUMENTS

| | | | |
|---|---|---|---|
| 2006/0196452 A1* | 9/2006 | Kern | F01P 7/04 |
| | | | 123/41.12 |
| 2006/0231234 A1* | 10/2006 | Kalbacher | F01P 3/18 |
| | | | 165/44 |
| 2008/0023173 A1 | 1/2008 | Savage | |
| 2008/0257286 A1* | 10/2008 | Harich | B60K 11/085 |
| | | | 123/41.12 |
| 2011/0219762 A1* | 9/2011 | Kobayashi | B60K 11/08 |
| | | | 60/456 |
| 2011/0240252 A1 | 10/2011 | Borski et al. | |
| 2014/0116658 A1* | 5/2014 | Kappelman | B60K 11/04 |
| | | | 165/121 |
| 2014/0186172 A1* | 7/2014 | Schafer | F04D 29/164 |
| | | | 415/209.1 |
| 2014/0301816 A1* | 10/2014 | Kokuryo | B60K 11/04 |
| | | | 414/687 |

\* cited by examiner

INTEGRATED COOLING AIR SHROUD ASSEMBLY

TECHNICAL FIELD

This document relates generally to the motor vehicle equipment field and, more particularly, to an integrated cooling air shroud assembly including an engine driven mechanical fan for charged air cooler airflow maximization.

BACKGROUND

Charge air coolers are provided on forced induction (turbocharged or supercharged) internal combustion engines in order to improve volumetric efficiency. This is done by reducing the induction air heat created by turbocharging or supercharging thereby increasing the intake air charge density.

As illustrated in published U.S. Patent Application 2011/0240252, the concept of providing a charge air cooler positioned directly in front of the radiator of a cooling fan driven by an internal combustion engine is known in the art. As should be appreciated, in such a component arrangement heat removed from the induction air by the charge air cooler travels downstream to the radiator thereby reducing engine cooling efficiency. Where engine cooling requirements are high, such an arrangement may necessitate equipping the vehicle with a larger radiator in order to provide the desired cooling.

This document relates to an integrated cooling air shroud assembly, a cooling module for a motor vehicle and a method of providing cooling air to a motor vehicle that provides for enhanced cooling. This is accomplished by placing the charge air cooler and radiator in parallel rather than series and drawing air through the charge air cooler and radiator utilizing a single motor vehicle driven fan. By offsetting the charge air cooler and the radiator, the radiator is no longer downstream of the charge air cooler and, therefore, no longer subject to the heat removed from the induction air at the charge air cooler. Advantageously, the resulting increases in the cooling efficiency of the radiator make it possible to utilize a lower capacity and less expensive radiator for certain vehicle applications. Further, by drawing air through the offset charge air cooler and radiator by means of a single motor vehicle engine driven fan, the need for a second electric fan for drawing air through the charge air cooler is avoided for many applications thereby reducing production costs.

SUMMARY

In accordance with the purposes and benefits described herein, an integrated cooling air shroud assembly is provided. That integrated cooling air shroud assembly comprises a body having a radiator opening, a charge air cooler opening and a cooling fan opening. The charge air cooler opening is offset from the radiator opening and the radiator opening and the charge air cooler opening are in parallel communication with the cooling fan opening.

More specifically, the body of the cooling air shroud assembly includes a first section incorporating the radiator opening and the cooling fan opening, a second section incorporating the charge air cooler opening and a transition section connecting the first and second sections. In one possible embodiment the first section overlies the transition section and the transition section overlies the second section.

In accordance with an additional aspect, a cooling module is provided for a motor vehicle. The cooling module comprises an integrated cooling air shroud assembly including a body having a radiator opening, a charge air cooler opening and a cooling fan opening. The charge air cooler opening is offset from the radiator opening and the radiator opening and the charge air cooler opening are in parallel communication with the cooling fan opening.

A radiator is held in the radiator opening. A charge air cooler is held in the charge air cooler opening. Further, a cooling fan is held in the cooling fan opening. A belt is provided for driving the cooling fan by means of the motor vehicle engine. An electronic clutch is provided between the motor vehicle engine and the cooling fan. In one possible embodiment, the cooling module also includes an electric fan for drawing air through the radiator.

In addition a motor vehicle is disclosed incorporating a cooling module.

In accordance with yet another aspect, a method is presented for providing cooling air to a motor vehicle. That method may be broadly described as comprising the steps of offsetting a charge air cooler from a motor engine radiator and drawing air in parallel from the radiator and the charge air cooler by means of a fan driven by the motor engine of the motor vehicle. The method further includes routing the cooling air through the radiator and the charge air cooler to the cooling fan by means of an integrated cooling air shroud assembly.

In the following description, there are shown and described several preferred embodiments of the integrated cooling air shroud assembly and the cooling module for a motor vehicle. As it should be realized, the air shroud assembly and the cooling module are capable of other, different embodiments and their several details are capable of modification in various, obvious aspects all without departing from the air shroud assembly and cooling module as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated cooling air shroud assembly, the cooling module and the related method of providing cooling air to a motor vehicle and together with the description serve to explain certain principles thereof. In the drawing figures.

Reference will now be made in detail to the present preferred embodiments of the integrated cooling air shroud assembly and cooling module, examples of which are illustrated in the accompanying drawing figures.

DETAILED DESCRIPTION

Figure 1:
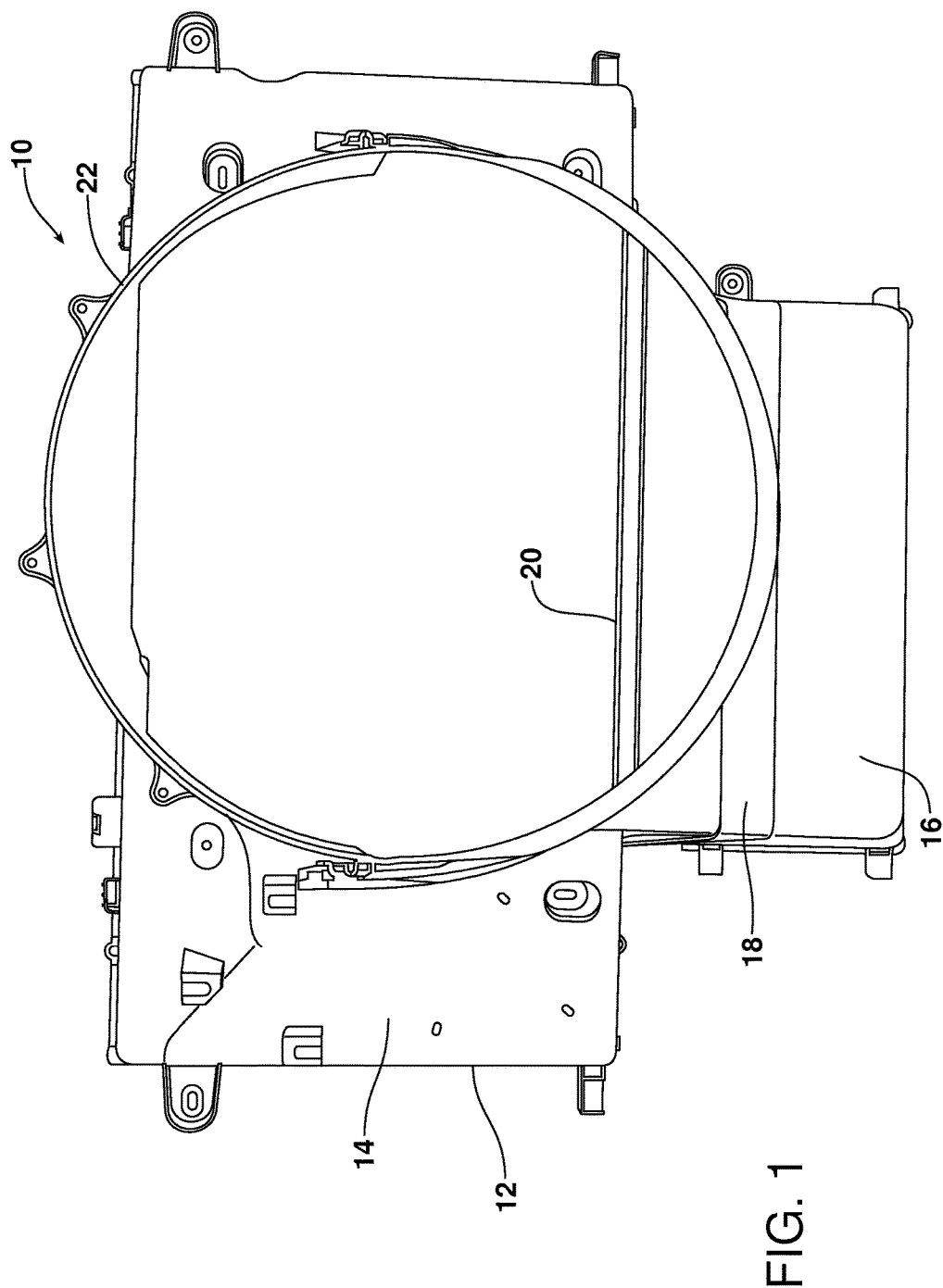
FIG. 1 is a rear elevational view of the integrated cooling air shroud assembly.

Reference is now made to FIG. 1 illustrating the integrated cooling air shroud assembly 10 that is the subject matter of this document. The air shroud assembly 10 comprises a body 12 including a first section 14, a second section 16 and a transition section 18 that connects the first and second sections together to form the integrated cooling air shroud assembly. As illustrated in FIGS. 1-5, the first section 14 includes a radiator opening 20 at a front face thereof and a cooling fan opening 22 at a rear face thereof. The second section 16 includes a charge air cooler opening 24 at a front face thereof, and a downstream air manifold 26 having an arcuate, upwardly sweeping rear wall 28. As should be appreciated, the first section 14 overlies the transition section 18 which overlies the second section 16. This construction or orientation provides a charge air cooler opening 24 that is offset from the radiator opening 20 so that the charge air cooler opening and radiator opening are in parallel communication with the cooling fan opening 22. In particular note how the air outlet 30 at the top of the air manifold 26 forces air through the transition section 18 into the first section 14 between the radiator opening 20 and the cooling fan opening 22.

Figure 2:
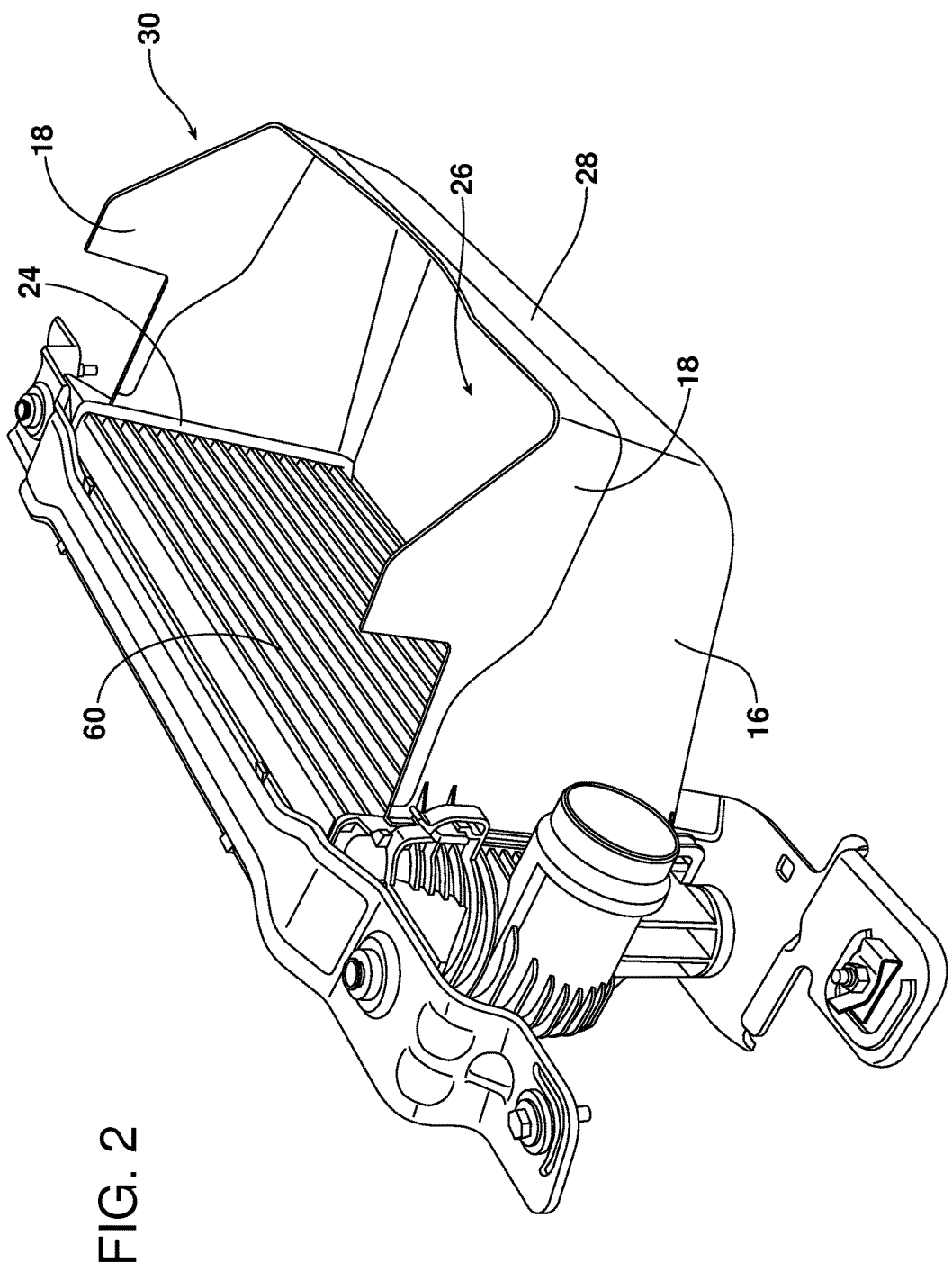
FIG. 2 is a detailed perspective view of the transition section and second section of the air shroud assembly illustrated in FIG. 1 further illustrating how the charge air cooler is connected to the second section.
Figure 3:
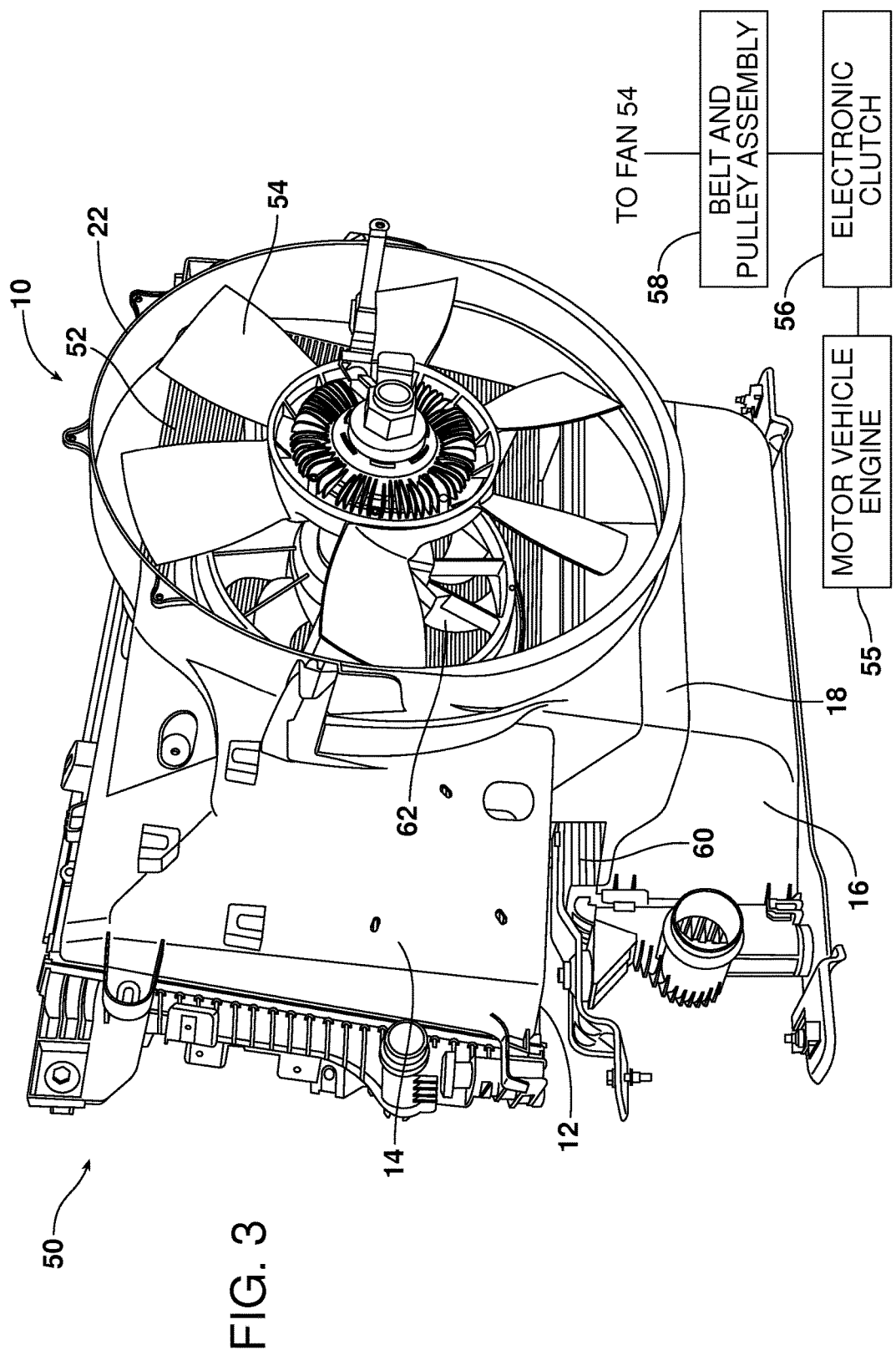
FIG. 3 is a perspective view of a cooling module for a motor vehicle in accordance with the teachings provided in this document showing the radiator and cooling fan mounted in the first section of the body of the integrated cooling air shroud assembly.
Figure 4:
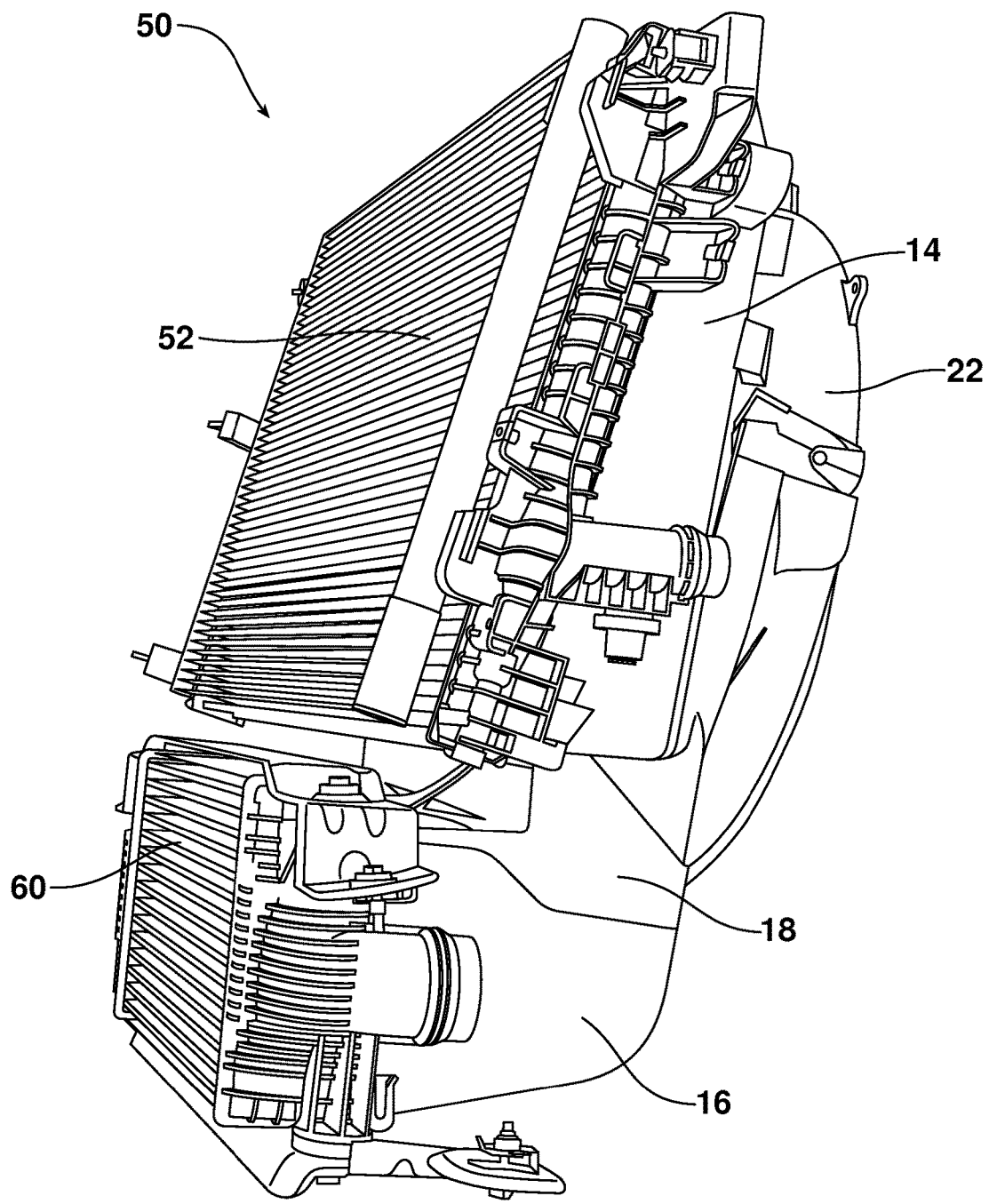
FIG. 4 is a front left side perspective view of the cooling module illustrated in FIG. 3 showing how the charge air cooler is offset from the radiator.
Figure 5:
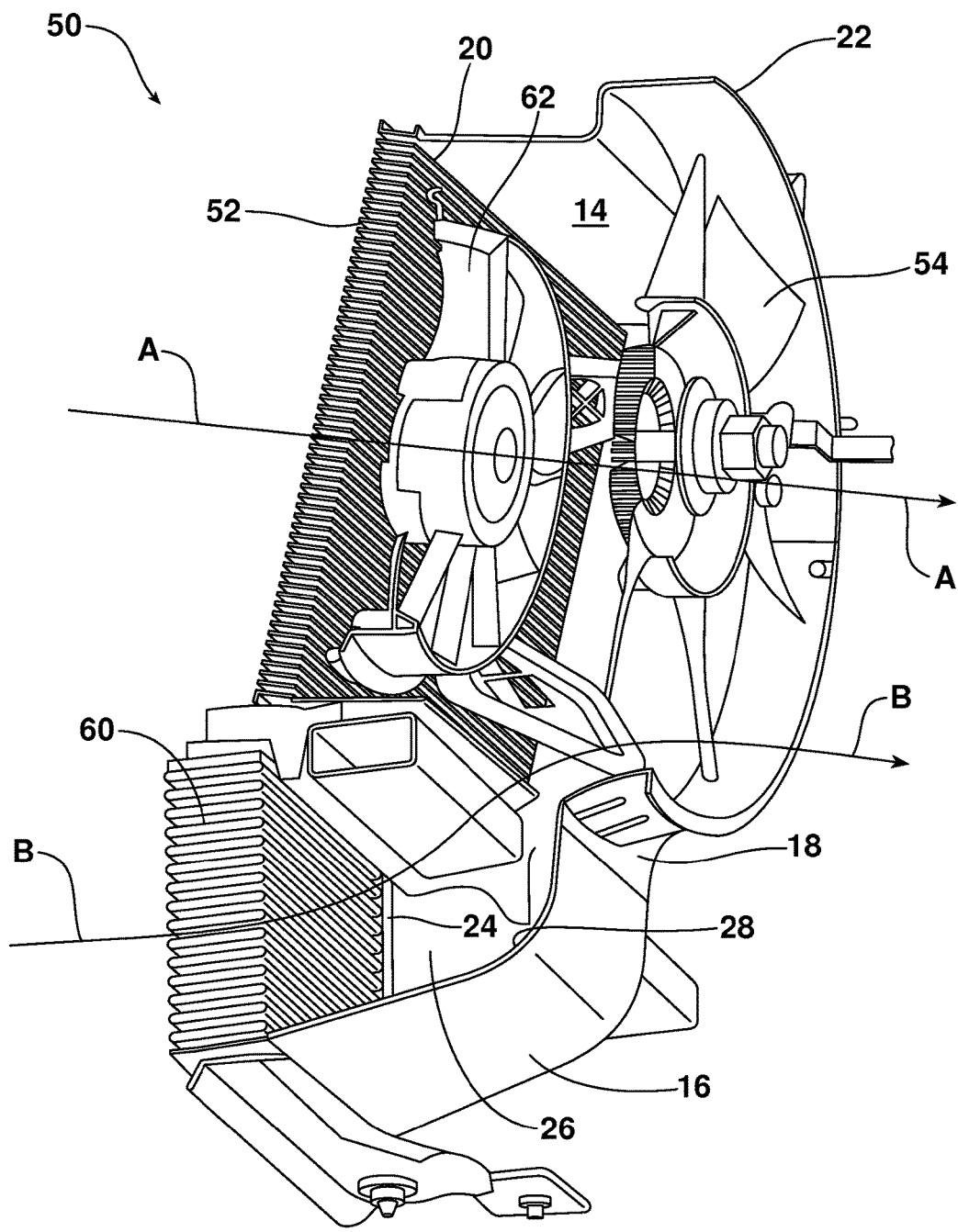
FIG. 5 is a cross-sectional view further illustrating how the air flows through the radiator and charge air cooler to the mechanical fan.

Reference is now made to FIGS. 3-5 illustrating a cooling module 50 incorporating the integrated cooling air shroud assembly 10 previously described. As illustrated, a radiator 52 is secured in the radiator opening 20 of the first section 14 while a cooling fan 54 is secured in the cooling fan opening 22 of the first section. That cooling fan 54 is driven by the motor vehicle engine 55 through an electronic clutch 56 and a belt and pulley system 58. As best illustrated in FIGS. 2, 4 and 5, the cooling module 50 also includes a charge air cooler 60 held in the charge air cooler opening 24 provided in the second section 16.

By offsetting the charge air cooler 60 from the radiator 52 and drawing air in parallel from the radiator and charge air cooler by means of the cooling fan 54 it is possible to maximize the cooling efficiency of both the radiator and charge air cooler utilizing a single fan. More specifically, cooling air is drawn through the radiator 52 in heat exchange relationship with the engine coolant. That cooling air carries heat through the first section 14 of the integrated cooling air shroud assembly until it is discharged directly past the cooling fan 54 through the cooling fan opening 22. Note action arrows A in FIG. 5. In contrast, cooling air passes through the charge air cooler 60 in heat exchange relationship with the forced induction air being drawn into the motor vehicle engine. That cooling air carries heat into the air manifold 26 of the second section 16 and is then directed upwardly by the sweeping rear wall 28 of that manifold so that it passes through the transition section 18 into the first section 14 downstream from the radiator 52, radiator opening 20 and electric radiator fan 62 but upstream from the cooling fan opening 22 and cooling fan 54. Note action arrows B in FIG. 5. Accordingly, the cooling fan 54 functions to discharge that air through the cooling fan opening. By offsetting the charge air cooler 60 from the radiator 52, heat from the charge air cooler is not drawn through the radiator 52 and more efficient and effective cooling is provided for the motor vehicle. Advantageously this is accomplished utilizing a single vehicle motor driven cooling fan 54.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An integrated cooling air shroud assembly, comprising:
   a body having: (i) a first section incorporating a radiator opening and a cooling fan opening; (ii) a second section incorporating a charge air cooler opening; and (iii) a transition section connecting said first and second sections, wherein said charge air cooler opening is offset from said radiator opening and said radiator opening and said charge air cooler opening are in parallel communication with said cooling fan opening;
   wherein the body defines a first airflow path sequentially from the radiator opening, through the first section, and through the cooling fan opening, and a second airflow path sequentially from the air cooler opening through the second section, through the transition section to the first section, and through the cooling fan opening.

2. The cooling air shroud assembly of claim 1, wherein said first section overlies said transition section and said transition section overlies said second section.

3. A cooling module for a motor vehicle, comprising:
   an integrated cooling air shroud assembly including a body having: (i) a first section incorporating a radiator opening and a cooling fan opening; (ii) a second section incorporating a charge air cooler opening; and (iii) a transition section connecting said first and second sections, wherein said charge air cooler opening is offset from said radiator opening and said radiator opening and said charge air cooler opening are in parallel communication with said cooling fan opening;
   a radiator held in said radiator opening;
   a charge air cooler held in said charge air cooler opening; and
   a cooling fan held in said cooling fan opening;
   wherein the module defines a first airflow path sequentially from the radiator held in the radiator opening, through the first section, and through the cooling fan held in the cooling fan opening; and
   wherein the module defines a second airflow path sequentially from the charge air cooler held in the charge air cooler opening, through the second section, through the transition section to the first section, and through the cooling fan held in the cooling fan opening.

4. The cooling module of claim 3 further including a belt and pulley system for driving said cooling fan by means of a motor vehicle engine.

5. The cooling module of claim 4 further including an electronic clutch between said motor vehicle engine and said cooling fan.

6. The cooling module of claim 5, wherein said first section overlies said transition section and said transition section overlies said second section.

7. The cooling module of claim 3, wherein said first section overlies said transition section and said transition section overlies said second section.

8. A motor vehicle incorporating the cooling module of claim 3.

9. A method of providing cooling air to a motor vehicle, comprising:
- offsetting a charge air cooler from a radiator; and
- drawing air from said radiator and said charge air cooler along a first path and a second path in a parallel direction by means of an integrated cooling air shroud assembly and a fan driven by an engine of the motor vehicle;
- wherein the integrated cooling air shroud assembly includes
  - a first section including a radiator opening and a fan opening housing the fan;
  - a second section including a charge air cooler opening; and
  - a transition section connecting the second section to the first section; and
- wherein the first path is defined sequentially by the radiator, the first section, and the fan, and the second path is defined sequentially by the charge air cooler, the second section, the transition section, the first section, and the fan.

\* \* \* \* \*